Sept. 8, 1953  E. S. BARTLETT  2,651,107
SHEARING HANDPIECE
Filed June 14, 1950  3 Sheets-Sheet 1
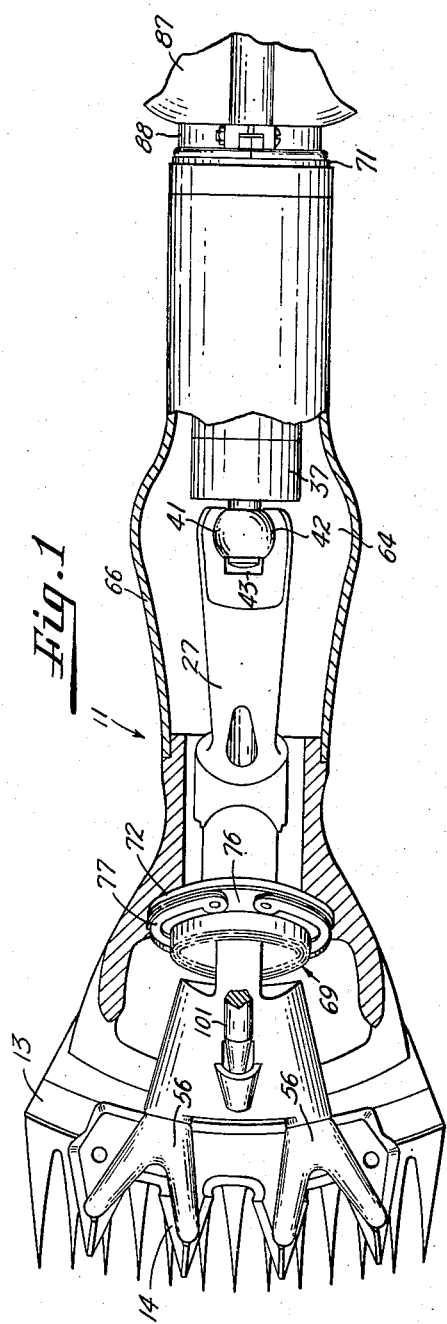
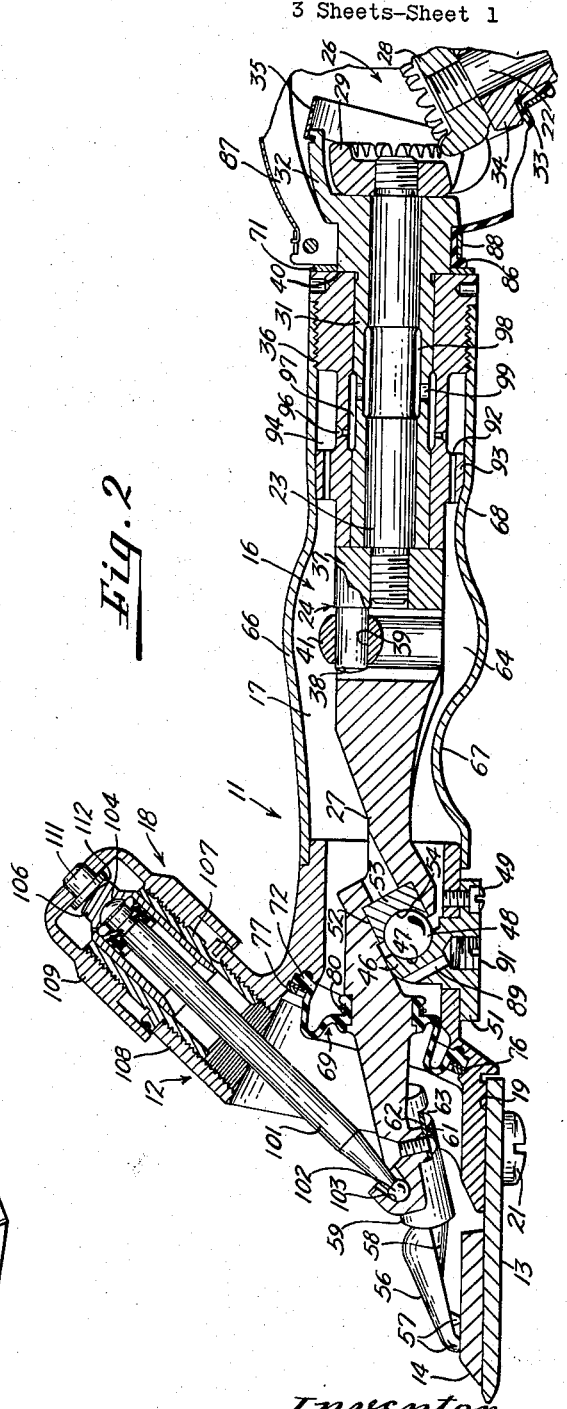
Inventor
Edwin S. Bartlett
By McCanna & Morsbach
Attys.

Sept. 8, 1953     E. S. BARTLETT     2,651,107

SHEARING HANDPIECE

Filed June 14, 1950     3 Sheets-Sheet 2

Inventor
Edwin S. Bartlett
By McKenna & Morelock
Attys.

Sept. 8, 1953  E. S. BARTLETT  2,651,107
SHEARING HANDPIECE
Filed June 14, 1950  3 Sheets-Sheet 3

INVENTOR.
Edwin S. Bartlett
BY McCanna & Morsbach
Atty's.

Patented Sept. 8, 1953

2,651,107

UNITED STATES PATENT OFFICE 2,651,107

SHEARING HANDPIECE

Edwin S. Bartlett, Ludington, Mich., assignor to Sunbeam Corporation, Chicago, Ill., a corporation of Illinois Application June 14, 1950, Serial No. 168,127

6 Claims. (Cl. 30—219)

The present invention relates to shearing handpieces and particularly to shearing handpieces useful for shearing sheep and the like. Specifically, the present invention is a continuation-in-part application of Serial No. 46,061 filed August 25, 1948, now abandoned.

The shearing handpiece of commercial sheep shearing equipment has changed very little over the years, and prior to the present invention was quite similar in construction to shearing handpieces used many years ago. Unfortunately, in shearing handpieces used heretofore, the bearing surfaces of the principal moving parts were exposed to dirt carried in the fleece being shorn as well as dirt in the surrounding atmosphere. When it is realized that the fleece of a sheep contains a large amount of oil together with dirt and other foreign matter, it will be appreciated that this combination of foreign matter and oil would have a serious effect on bearing surfaces and thereby tend to decrease the life of such handpieces. Moreover, such handpieces required frequent servicing during their life. It would be desirable, therefore, to provide a handpiece in which the bearing surfaces of the principal working parts are sealed against contact with dirt, animal fibers and the like.

The conventional shearing handpiece extensively used heretofore comprised a pivotally mounted driving fork having one end connected to a crank for converting rotary motion from a suitable prime mover to oscillating movement of a cutter. In order to provide the desired force biasing the cutter and the comb into shearing engagement for satisfactory shearing operation, it has been customary to provide adjustable means for varying the force applied between the cutter and the comb. This force is conventionally applied through an elongated pin engaging the fork at a point intermediate the connection with the cutter and the pivot for the fork. In most standard handpieces, this elongated pin has been disposed at an angle of about sixty degrees with the longitudinal axis of the handpiece. Various arrangements of this pin have been employed to increase the life of such handpieces, but most of these have not proven very satisfactory. Moreover, in handpieces employed heretofore, it has been necessary to apply a force substantially in excess of one hundred pounds to the tension pin in order to get the desired force of about forty pounds between the cutter and comb. This means that an unusually large force is applied to the pivot of the fork with the consequent wear and relatively short life of these parts. It would be desirable to provide a shearing handpiece in which the parts thereof were so arranged as to produce a greatly increased life with a minimum pressure applied to the tension pin and pivot while still providing the desired pressure between the cutter and comb.

Years of investigation and trial of various designs of handpieces has shown that all conventional shearing handpieces employed heretofore have lacked rigidity in vital parts. Furthermore, the distribution of weight of the handpiece has not been as satisfactory as possible, it being desirable to have a light handpiece with a proportional increase in weight at the forward end thereof so as to improve the balance. This last feature of handpiece balance is rather difficult to define but is an extremely important aspect of a shearing handpiece and is immediately sensed by users even though they may not be able to explain why more satisfactory operation is obtained. Extensive tests have demonstrated that rigidity in the oscillating fork and the forward portion of the handpiece which supports the comb as well as the part supporting the tension pin is vital to satisfactory operation. In prior art handpieces in order to secure the necessary rigidity in the fork, cumbersome heavy reinforcing fins were added. It would be desirable, therefore, to provide an improved shearing handpiece providing the desired rigidity without sacrificing the balance and, if anything, improving the weight distribution. Also, it would be desirable to provide an arrangement in which reinforcing fins for the fork are unnecessary, and yet increased rigidity of the fork over prior art arrangements is still obtained.

Accordingly, it is an object of the present invention to provide a shearing handpiece in which the angularity of the tension pin is considerably reduced over prior art arrangements, thereby providing an improved force distribution and greatly increased life.

It is another object of the present invention to provide an improved shearing handpiece having greater rigidity of vital parts without interfering with weight or balance and, if anything, improving the balance of the handpiece.

Still another object of the present invention is to provide an improved shearing handpiece having a more satisfactory distribution of total weight including a proportional increase in the weight of the forward end of the handpiece.

It is a further object of the present invention to provide a shearing handpiece in which the force applied to the driving fork for biasing the cutter into shearing engagement with the comb is applied at a point on the fork much closer to the cutter than to the pivot of the driving fork, whereby the pivot is subjected to a minor fraction of the force applied to the fork and the cutter is subjected to a major fraction of this force.

A still further object of the present invention resides in the provision of a handpiece in which the bearing surfaces of the principal working parts are sealed against contact with dirt and extraneous material of all sorts.

Still another object of the present invention resides in the provision of a novel handpiece construction which is simple to manufacture, easy to assemble and foolproof in operation.

It is another object of the present invention to provide a novel arrangement and construction of the component parts of the handpiece wherein a great increase in speed of operation of the handpiece may be had as compared with conventional handpieces employed heretofore with improved operating characteristics.

It is another object of the present invention to provide a handpiece which eliminates the disadvantages referred to above and incorporates the desirable features mentioned above, which is extremely flexible in use, has a much longer life than handpieces employed heretofore and which give satisfactory and foolproof operation through long years of service.

Further objects and advantages of the present invention will become apparent as the following description proceeds, and the features of novelty which characterize the invention will be pointed out with particularity in the claims annexed to and forming a part of this application.

For a better understanding of the present invention, reference may be had to the accompanying drawings in which:

Fig. 1 is a top plan view with certain portions thereof cut away to show the internal working parts of a handpiece embodying the present invention;

Fig. 2 is a vertical sectional view taken substantially along the longitudinal axis of the handpiece shown in Fig. 1;

Figure 3:
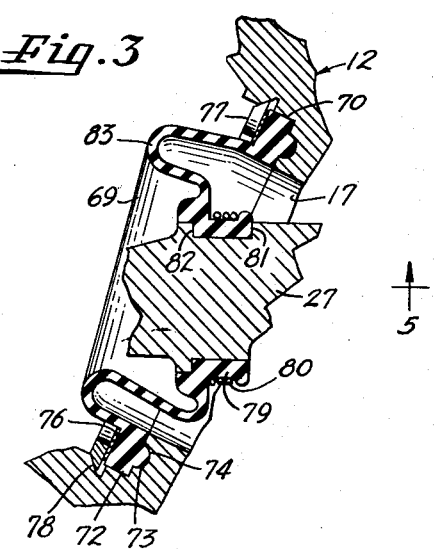
Fig. 3 is an enlarged fragmentary sectional view of the forward end of the handle assembly showing the means for sealing the forward end of the assembly against dirt and other extraneous material.

The shearing handpiece of the present invention is in general designed quite similarly in many respects to the handpieces disclosed in United States Letters Patent 2,296,230—Brookes—and 2,296,236—Musolf—both assigned to the same assignee as the present application. These prior patents show shearing handpieces of the type extensively employed heretofore. The shearing handpiece of the present invention includes the same functional basic elements disclosed in these patents and particularly comprises a handle assembly 11 including a head 12, a comb 13 secured to the head 12, a cutter 14, means for driving the cutter generally designated by the reference numeral 16 and disposed within a chamber 17 formed in the handle assembly 11, and means 18 for adjusting the tension or pressure between the cutter 14 and the comb 13. Long years of use of shearing handpieces have demonstrated the desirability of providing a shearing force between the cutter and the comb of between forty-seven and fifty pounds. In order to provide this force at all times, the means 18, described in greater detail hereinafter, is provided which not only permits adjusting for the desired initial force, but serves to take care of wear between the cutter and comb requiring periodic readjustment.

Considering first the handle of the shearing handpiece 11 of the present invention, it may be observed that it embodies novel features which form an important aspect of the present invention. Heretofore, the handles of shearing handpieces have been made as a casting or malleable forging in order to provide adequate strength and wearing qualities. Consequently, these handpieces could not have the desired balance and still the necessary lightness. In the present handpiece the head 12, which is only a small portion of the overall length of the handpiece, is formed of a casting and preferably is formed from an aluminium alloy rather than malleable iron as was the case heretofore, thereby providing a substantial decrease in weight. Furthermore, the handle portion of the handpiece, in accordance with the present invention, is formed of relatively thin wall metal tubing, generally designated at 66, which defines the chamber 17 therein for the working parts of the handpiece. Actually, the chamber 17 also extends into the head portion 12. Preferably, an intermediate portion of the thin wall tubing 66 is enlarged, as indicated at 64, to provide the necessary clearance for the rotation of a crank 24 and the oscillation of a fork 27 both described in greater detail hereinafter. Preferably, the tubing 66 is fixed to the head 12 by soldering or brazing. This construction is particularly advantageous from a manufacturing standpoint because the handle portion 66 may be formed from conventional tubing and the whole arrangement permits of simple assembly operations. Preferably also, the tubular member 66 is of a diameter that may readily and conveniently be grasped by the operator while still permitting a large enough central opening to permit the operation of the moving parts contained therein. This was difficult of attainment heretofore, when the handle was a casting which required substantially thicker walls and hence either had to be of larger outside diameter with the inherent feature of making the handpiece difficult to grasp, or alternatively had to have a small bore with limitations on the movements of the parts contained therein.

To further aid in making the handpiece easy to hold by the operator, the under side of the forward end of the tubular member 66 is preferably depressed, as indicated at 67, and similarly at the rear of the enlarged portion 64 the tubular member 66 is also contracted, as indicated at 68. The enlargement 64 and the depressions 67 and 68 provide a natural grip for the fingers of the operator. The depression 68 furthermore permits a wedge fit with a bearing member support described in detail hereinafter. In manufacturing the tubular handle 66, the enlarged portion 64 and the depressions 67 and 68 are formed therein by hydraulic expanding or other methods which rapidly and in an inexpensive manner permit the attainment of the desired shape of the handle portion. As was mentioned earlier in the specification, this construction of the effective housing for the moving parts of the handpiece with the head 12 formed of a light aluminum alloy and the handle portion 66 formed of metal tubing, permits a light weight construction which still has the desired rigidity so essential in shearing handpieces. It has furthermore been discovered that a handpiece constructed in the manner described above provides a greatly improved handpiece from the standpoint of balance, since a larger proportion of the weight may be included at the forward end thereof, which can be properly reinforced without increasing the total weight beyond that desired. Moreover, the proportional increase in weight at the forward end of the handpiece gives an improvement in the balance of the handpiece which, while difficult to define, is readily sensed by the users, and it has been found that commercial sheep shearers greatly desire the present handpiece even without the numerous other features thereof, solely on the basis of the improved balance.

In addition to improved balance, the handpiece of the present invention still provides the desired rigidity, particularly in the entire forward portion of the handpiece which supports the tension adjusting means 18. Preferably also, if threaded openings are required in the head 12, which is formed of a light metal alloy, threaded steel inserts are employed.

In order to support the cutter 13 in the conventional manner at the forward end of the handpiece 11, the head 12 is provided with an extending flange including a shoulder 19. The comb 13, provided with the conventional teeth, is fastened to this shoulder 19 as by suitable screws 21. Preferably, as was mentioned above, steel threaded inserts are cast within the head 12 to accommodate the screws 21. Consequently, the comb 13 may be rigidly secured to the head 12 in a manner so as effectively to become an integral part thereof. The cutter 14 is preferably of conventional construction and is mounted on the upper surface of the comb 13 for reciprocal movement thereacross. The cutter also is provided with suitable teeth which, in cooperation with the comb teeth, provide the desired shearing action.

It will be understood that the cutter 14 must be oscillated relative to the comb 13 in order to produce cutting action, and the source of power for driving the cutter 14 comprises a suitable prime mover, not shown. In order to transmit power from a prime mover, commonly of the rotary type, to the cutter 14 and convert this rotary motion to oscillatory motion, there are provided spindles 22 and 23 related at a universal joint 26, a crank generally indicated at 24, and a fork 27, the latter two elements converting the rotary motion of the spindle 24 to oscillating motion of the cutter 14. Considering now first the shaft 22 and spindle 23, attention is particularly directed to Fig. 2 of the drawings, where it may be observed that the rear end of the tubular member 66 is provided internally with suitable threads for holding a screw bushing 36 in proper position. The forward end of the screw bushing 36 is provided with an annular rib 93 which, when the bushing is fully inserted as indicated in Fig. 2 of the drawings, provides a wedge fit with the inside of the tubular member 66 adjacent depression 68. This insures a rigid bearing support within the tubular handle 66. The bushing 36 is adapted to receive therein the bearing 31 for the spindle 23. This bearing 31 is effectively a sleeve bearing and includes an integral yoke portion 32 which cooperates with means to be described hereinafter to provide a universal joint conventionally associated with shearing handpieces such as 11. The yoke 32 is preferably formed with an annular shoulder 40 which engages with the rear end of the screw bushing 31 so as to properly position the sleeve bearing 31 in the bushing 36.

To drivingly relate the shaft 23 with the crank 24 and the shaft 22, both ends of the shaft 23 are threaded. The forward threaded end of the shaft 23 is adapted to receive the crank head 37, which abuts against the inner end of the bushing 36 and the sleeve bearing 31. The other threaded end of the shaft 23 is adapted to receive a cog 29 which has an annular shoulder abutting the end of the yoke 32. This construction prevents axial displacement of the spindle 23. As is clearly illustrated in Figs. 1 and 2 of the drawings, the crank block 37 is provided with a crank pin 38 of substantial length. This crank pin 38 is adapted to support thereon a spherical bearing 41 having an opening 39 therethrough for accommodating the crank pin 38. This spherical bearing 41 and crank pin 38 upon rotation of the shaft 23 require the space provided for by the enlargement 64 in the tubular housing 66.

In order to prevent the escape of lubricant disposed within the chamber 17 from the rear end thereof, a sealing washer 71 embracing the yoke portion 32 is provided which abuts against the rear end of the threaded bushing 36. The fit between the washer 71 and the bushing 36 is preferably a honed or ground fit. The washer 71 is forced into engagement with a sleeve extension 86 of a housing which forms a joint guard for the universal joint to be described hereinafter. This housing 86 may be formed of suitable compressible material such as leather or the like, and is preferably secured to the yoke 32 by a clamp 88. Tightening of the clamp 88 causes the sleeve 86 to expand axially and urge the washer 71 into sealing engagement with the end of the bushing 36. The foregoing construction, together with the close fits of the bearing surfaces between the spindle 23 and the sleeve bearing 31, as well as between the bearing 31 and the bushing 36, assures an oil and dust tight seal for the rear end of the chamber 17.

To provide rotation of the spindle 23 in response to rotation of the shaft 22 which is preferably connected to a suitable prime mover, the shaft 22 is suitably journaled in a bearing 33 having an integral yoke extension 34 quite similar in construction to the bearing 31 and associated yoke 32. The end of the shaft 22 adjacent the spindle 23 is threaded and provided with a cog 28 arranged to be in driving engagement with the cog 29 for a wide divergence of angular relationships between the spindles 22 and 23. Actually driving engagement is provided when the shafts 22 and 23 are substantially in coaxial alignment and similarly driving engagement is provided when the shafts are displaced by less than ninety degrees. The housing 87 houses the yoke 34 as well as the yoke 32, which are preferably held in assembled relationship within this housing 87 by a joint spring 35, which is conventionally employed for this purpose. The housing 87 prevents one from inadvertently coming into contact with the cogs 28 and 29.

As was mentioned above, the fork 27 transmits the motion of the crank pin 38 directly to the cutter 14 and, as illustrated, is pivotally mounted intermediate its ends in a conventional manner, illustrated, for example, in either one of the above mentioned United States Letters Patents. To make driving connection with the crank 24, the end of the fork 27 adjacent the spindle 23 is provided with a vertically extending cylindrical recess 42 for receiving therein the spherical bearing 41 rotatably mounted on the crank pin 38. The cylindrical recess 42 is furthermore provided with a forwardly extending groove or recess 43 for receiving therein the end of the crank pin 38. The maximum depth or forward extension of the groove or recess 43 is determined by the position of the crank pin 38 shown in Fig. 1 of the drawings, namely, when the fork 27 and crank pin 38 are in axial alignment or in their center position, for in this position the pin 38 extends farther into the groove 43 than at any other time, and particularly extends farther therein than when the fork 27 is in either of its extreme lateral positions. By providing this groove 43 for receiving the end of the crank pin 38, it is apparent that the pin 38 may be made long enough to project through the spherical bearing 41 in either extreme position of the fork 27, thereby assuring full bearing contact between the crank pin 38 and the spherical bearing 41 for every position of the fork 27.

To support in a pivotal manner the intermediate portion of the fork 27, there is provided a pivot post 46 which is adapted to extend into the chamber 17 within the head 12. Preferably, the head 12 is provided at its under side with a suitable aperture to receive the pivot post 46 which is illustrated as being provided with an integral annular flange 51. When the pivot post 46 is inserted within the aperture in the head 12, the annular flange 51 abuts against the bottom surface of the head 12. The pivot post 46 is preferably retained in fixed relation with the head 12 by means of the screws 49 extending through the annular flange 51 and threaded into the head 12. As illustrated in the drawings, the pivot bearing for the fork 27 at its intermediate end is preferably a spherical bearing of the type shown in the above mentioned Brookes patent. To support such a spherical bearing, designated at 48 in Fig. 2 of the drawings, the pivot post 46 is provided with a cavity 47 for engagement with the spherical bearing 48. Furthermore, the fork 27 is provided with a recess 52 for receiving therein the fork cup 53 which is provided with a curved recess 54 to engage the surface of the spherical bearing 48. Thus, the pivot ball or spherical bearing 48 is disposed between the pivot post 46 on one side and the fork cup 53 on the opposite side. By using such a spherical bearing 48, long life of the fork pivot is provided.

In order drivingly to connect the end of the fork 27 remote from the crank 24 to the cutter 14, the forward end of the fork 27 is provided with longitudinally extending recesses for receiving the shank portions of a pair of fork yokes 56. These fork yokes 56 are similar to the fork yokes disclosed in the above mentioned Musolf patent, and at their outer ends each yoke is provided with depending conical projections 57 shaped to be received within suitable recesses in the upper surface of the cutter 14. The fork yokes 56 are provided with shanks 58 adapted to be received within the longitudinally extending recesses defined in the forward end of the fork 27. Preferably, the forward end of the fork 27 is provided with a pair of somewhat longitudinally extending sleeves 59, each provided with the recesses mentioned above to receive the yoke shanks 58. To secure the yokes 56 to the fork 27, there are preferably provided yoke retainers 61 which are secured to the under side of the fork 27 by suitable screws. Preferably, each yoke retainer 61 has arm portions 62 disposed in transversely extending slots 63 formed on the under side of the sleeves 59 to engage recesses, not shown, formed in the shanks 58 of each yoke 56. Preferably, the fork 27 including its intermediate pivotal support and the fork yokes 56 are counterbalanced for vibration-free oscillating motion.

As a result of the construction of the moving parts described in detail above, extensive bearing surfaces are provided for every part so that the spindle 23 of the shearing handpiece 11 may be driven at 3500 R. P. M. It was found inadvisable with prior art handpieces to exceed speeds of 2400 R. P. M., and it was customary for the manufacturer to attach notices to prior art handpieces indicating that the speed should not exceed 2400 R. P. M. The increased speed permissible with the present handpiece makes for greatly increased efficiency on the part of the operator and furthermore decreases the time required in shearing a particular animal.

For the purpose of lubricating the moving parts contained within the chamber 17, the latter is preferably filled, or at least partially filled, with lubricant. In order to supply lubricant to the chamber 17, a passageway 89 is provided in the post 46 which is accessible when a plug 91, threaded into the pivot post 46 is removed. The normal capacity of the chamber 17 is approximately two or three tablespoons of lubricant. Normally lubricant is added to the chamber 17 every two or three days when the handpiece is in continuous operation. With this construction the spherical bearing 48 and the crank roller 41 effectively run in oil, thereby insuring proper lubrication. In order to lubricate the spindle 23, the rib 93 described above for supporting the bearing sleeve 36 is provided with axially extending passageways 92, thereby permitting communication from the chamber 17 to an annular chamber 94 defined by a recess in the screw bushing 36 and the tubular housing 66. An annular chamber 97 is also provided between the screw bushing 36 and the sleeve bearing 31. The annular chambers 94 and 97 are interconnected for the passage of lubricant therebetween by means of passageways 96. Also, passageways 99 further connect the annular lubrication chamber 97 with an annular chamber 98 immediately surrounding an intermediate portion of the spindle 23. Thus, it is apparent that lubricant is supplied from the chamber 17 to the chambers 94, 97 and 98, thereby supplying lubricant not only to the spindle 23 but also to the sleeve bearing 31 on opposite sides of the chamber 98.

With the arrangement described thus far, it will be apparent that rotation of the spindle 23 causes oscillating movement of the cutter 14. Without more, however, sheep shearing would be impossible, since it is essential that a predetermined pressure of the order of forty pounds exist between the comb 13 and the cutter 14 for satisfactory shearing operation. In order to supply this force, the shearing handpiece of the present invention employs the tension means 18 referred to above and the conventional tension pin 101, which transmits force between the adjustable tension means 18 and the fork 27. As is clearly shown in Fig. 2 of the drawings, the fork 27 is provided at its forward end with a bearing socket 103 for receiving therein the rounded lower end 102 of the tension pin 101. The upper end of the tension pin 101 is provided with a rounded bearing surface 104 receivable within a tension nut cup 106. To accommodate the tension adjusting means 18, the head 12 is provided at its upper end with an inclined sleeve 108 forming an integral part of the head 12. This sleeve is inclined at an angle corresponding with the angle of the tension pin 101 described in greater detail hereinafter. Moreover, the inside of the sleeve 108 is threaded so as to accommodate a tension nut screw bushing 107 having an inner diameter of such size as to slidingly receive therein the tension nut cup 106 mentioned above. The sleeve 107 is provided with an annular flange at its intermediate portion which is adapted to rest on the upper surface of the sleeve 108. The upper portion of the tension nut screw bushing 107 is threaded so as to receive in threaded engagement therewith the tension nut 109. This tension nut 109 is provided with a pin 111 having a flat end surface 112 shaped to abut against the tension nut cup 106 so that by adjusting the position of the tension nut 109 relative to the tension nut screw bushing 107, the tension applied to the tension pin 101 may be varied in a desired manner.

Figure 6:
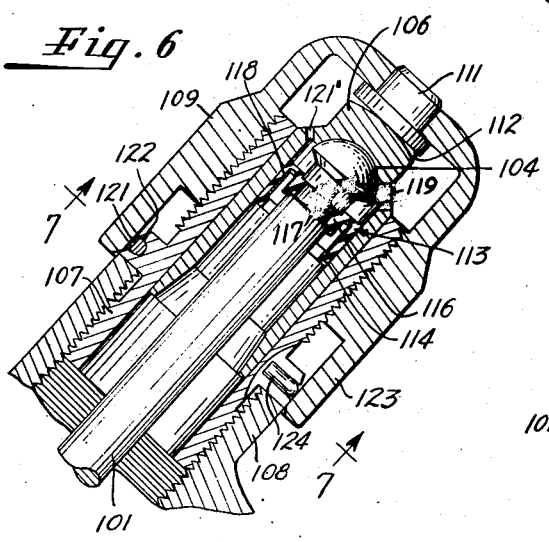
Fig. 6 is an enlarged fragmentary sectional view of a portion of Fig. 2.

For the purpose of sealing the upper bearing surface 104 of the tension pin 101 against the exposure to dirt and the like during the shearing operation, there is provided a seal formed by a diaphragm 113 which is shown best in Fig. 6 of the drawings. The diaphragm 113 comprises an outer sleeve portion 114 shaped to engage the inner walls of the tension nut cup 106. Furthermore, the diaphragm 113 is formed with a central portion 116 shaped to be disposed within an annular groove 117 formed near the upper end of the tension pin 101. A suitable expansion ring 118 is disposed within the sleeve portion 114 of the diaphragm 113, which causes the sleeve portion 114 to expand and engage the inner walls of the cup 106. The diaphragm 113, together with the upper end of the tension cup 106, defines a reservoir 119 for lubricant, which lubricates the bearing surface 104 of the tension pin 101. In order to supply lubricant to the reservoir 119, the tension nut 109 is removed, inverted, and a few drops of lubricant are placed within the cup portion. When the latter is threaded back onto the tension nut screw bushing, lubricant flows through the passageways 121' defined within the tension nut cup 106 into the chamber 119.

Figure 7:
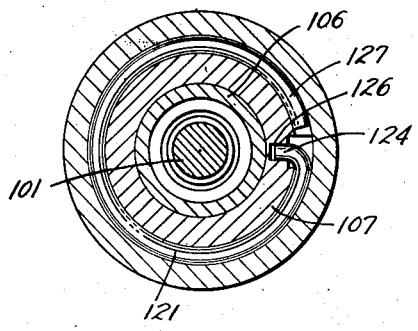
Fig. 7 is a sectional view taken substantially along the line 7—7 of Fig. 6, assuming that Fig. 6 shows the complete structure.

It will be understood that once the tension applied to the tension pin 101 is properly adjusted, it is desirable that it should remain so adjusted. To insure that this occurs, means are included in the tension adjusting means 18 for positively retaining the same in any desired adjusted position. The means for this purpose is best shown in Figs. 6 and 7 of the drawings and, as illustrated, comprises an annular expansion ring 121 disposed within an annular groove 122 formed in the annular flange of the tension nut screw bushing 107 referred to above. The ring 121 is so shaped that its outer periphery engages a skirt portion 123 of the tension nut 109. Moreover, the expansion ring 121 is anchored by having one end 124 deformed as a lateral projection so as to be insertable within a radially extending recess 126 formed in the bushing 107. The opposite end 127 of the ring 121 is free to move within the groove 122. With this construction the forces in the expansion ring 121 are such that the ring tends to expand radially into engagement with the tension nut 109 and maintain it in any desired adjusted position. The force developed between the ring 121 and the tension nut 109 permits relatively free movement of the latter in a clockwise direction as viewed in Fig. 7 of the drawings, but retards its movement in the opposite direction, in other words, retards movement which tends to release the pressure applied to the pin 101.

Figure 8:
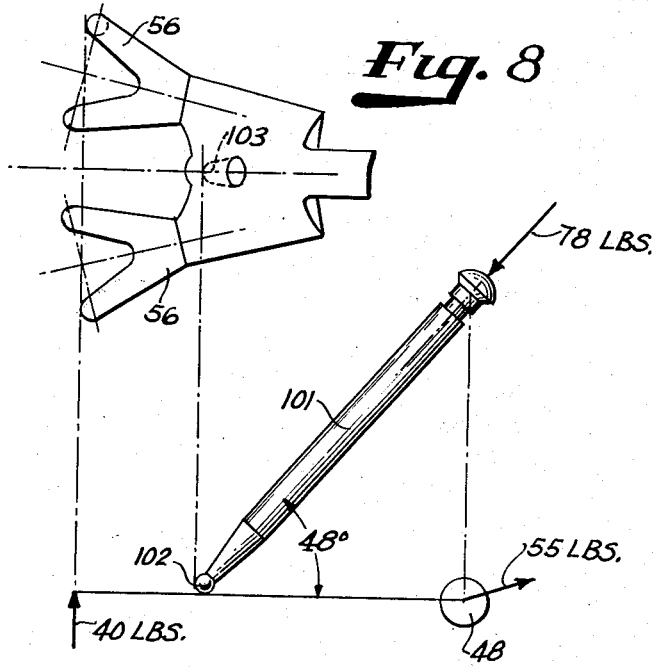
Fig. 8 is a force diagram of the fork and tension pin of the shearing handpiece of the present invention.
Figure 9:
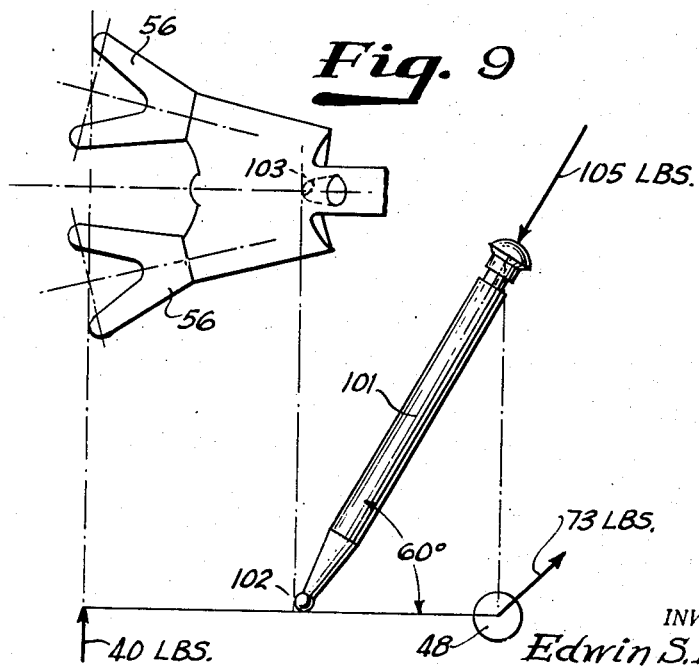
Fig. 9 is a view similar to Fig. 8 of a prior art shearing handpiece for comparison with Fig. 8 in order more clearly to show the advantages of the present handpiece over constructions employed heretofore.

In tension pin arrangements employed heretofore, it has been standard practice for the sleeve 108 and the tension pin 101 to be disposed at an angle of the order of sixty degrees or more with the longitudinal axis of the handle of the shearing handpiece. It is an important aspect of the present invention to provide an arrangement whereby the sleeve 108 and the pin 101 are inclined at a relatively smaller angle with respect to the handle 66. This angle is preferably substantially less than fifty degrees, and in one embodiment built and successfully tested in accordance with the present invention, the center line of the tension pin was inclined at an angle of forty-eight degrees with the center line of the tubular handle. By virtue of employing this decreased angle, the bearing socket 103 in the fork 27 may be positioned much closer to the cutter 14 than to the pivot post 46, and consequently the force transmitted through the pin 101 is more directly applied to the cutter 14 where it is desired than to the pivot post of the fork 27 where it is not desired and where it only causes wear. In other words, less pressure exists between the bearing surface 104 and the tension nut cup 106 to effect a given force between the cutter 14 and the comb 13 than in prior art designs. As a matter of fact, remarkable results have been obtained by reducing the angularity between the tension pin and the longitudinal center line of the handpiece to the extent that the life of the handpiece has been multiplied substantially fourfold. This can be appreciated by an examination of Figs. 8 and 9 of the drawings, which are force diagrams of the fork of the present invention and of the fork of a prior art handpiece, respectively. Both force diagrams clearly show that the desired force of forty pounds is applied between the cutter 14 and the comb 13. However, in the prior art construction, in order to obtain this force, it is necessary to apply a force of one hundred five pounds at the tension pin 101, which results in a force at the spherical bearing 48 of seventy-three pounds. With the present invention, the same force at the cutter 14 is obtained when the tension pin transmits only seventy-eight pounds and under these conditions, the spherical bearing 46 only sustains a force of fifty-five pounds, less than half of the force applied in prior art constructions. It is believed that the fourfold increase in life of the present shearing handpiece is due in a large extent to the increased angularity of the tension pin 101 and consequently, the application of the tension force close to the cutter 14 rather than close to the pivot point comprising the spherical bearing 48.

It will be apparent that reducing the angle of the tension pin with reference to the center line of the handpiece will cause less interference between the handpiece and the fleece being shorn, since the forward end of the handpiece presents a more streamlined appearance. This further tends to increase the efficiency of the operator. In addition, the reduction of angularity between the tension pin and the longitudinal center line of the handpiece permits greater rigidity of the fork 27 to be secured. In prior art arrangements, it was found necessary to add cumbersome and heavy reinforcing fins to give the necessary rigidity to the fork 27. By moving the bearing socket 103 forward, thereby reducing the angle of the tension pin already mentioned, flexing of the fork when shearing tension is applied thereto is completely eliminated. Furthermore, as was pointed out above, the great reduction in force transmitted through the tension pin 101 as contrasted with prior art arrangements would tend to eliminate flexing and also eliminate the requirement of any reinforcing fins or the like. This furthermore reduces the mass of the moving parts and permits the high speed operation referred to above.

Figure 4:
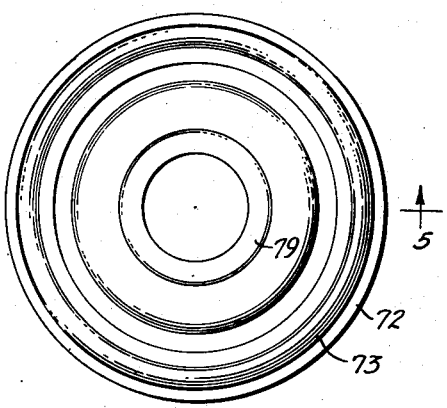
Fig. 4 is a plan view of an element shown in Fig. 3.
Figure 5:
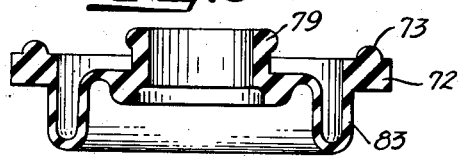
Fig. 5 is a sectional view taken substantially along the line 5—5 of Fig. 4.

As described above, the shearing handpiece is sealed at its rear against the entrance of dust and dirt and also adjacent the tension adjusting means 18. In order to prevent the entrance of such dust, dirt and the like from the pivot bearing for the fork 27, the forward end of the chamber 17 is closed by means of a flexible diaphragm 69. As is best shown in Figs. 3, 4 and 5, the diaphragm 69 is generally circular in shape and is disposed in a recess 70 in the head 12. The diaphragm is formed with a ring portion 72 on its periphery having a bead 73 on one face shaped to be received in an annular groove 74 formed in the head 12 adjacent the opening in the handle assembly defining the chamber 17. On its opposite face the ring portion is shaped to be engaged by a washer 76. An expansion snap ring 77 is disposed adjacent the washer 76 and is utilized to secure the diaphragm in position in the head 12. On its periphery the snap ring is beveled and engages a correspondingly shaped recess 78 formed in the head 12. With this construction the diaphragm is constantly urged into tight engagement with the head 12 and the bead 73 positively seats in the annular groove 74. The central portion of the diaphragm is in the form of a sleeve 79 shaped to be mounted on the correspondingly shaped portion of the fork 27 between the pivot post 46 and the cutter 14. Shoulders 81 and 82 on the fork 27 engage opposite ends of the sleeve 79 to prevent axial displacement of the diaphragm and also to insure a good seal between the fork and the diaphragm. The seal between the fork and the diaphragm may also be enhanced by tightly wrapping hard twisted cord 80 or the like about the sleeve 79. The sleeve 79 of the diaphragm 69 and the outer ring 72 are connected by an annular member 83 having a generally U-shaped cross section. The walls of the U-shaped portion are formed from relatively thin material. The diaphragm may be formed from any suitable material, one such material being neoprene. In the assembled position of the diaphragm, as best seen in Figs. 2 and 3, the ring portion 72 is inclined at an angle to the horizontal axis of the handpiece and the sleeve portion 79 is in a generally vertical plane.

Experience indicates that the foregoing described construction results in a diaphragm that may be flexed as required by the oscillatory movement of the fork 27 and also is unaffected by lubricants such as oil.

In view of the detailed description included above, the operation of the shearing handpiece of the present invention will be readily understood by those skilled in the art. Briefly, the shaft 22 is connected to a suitable source of power for effecting rotation thereof. By virtue of the cogs 28 and 29 associated with the universal joint 26, rotation of the shaft 22 causes rotation of the spindle 23 and consequently the crank head 37. Rotation of the crank pin 38 effects oscillation of the inner end of the fork 27 about the spherical bearing 48 associated with the pivot post 46. The opposite or forward end of the fork 27 connected to the cutter 14 through the fork yokes 56 is simultaneously oscillated, whereby shearing action between the cutter 14 and comb 13 occurs. A universal joint 26 permits freedom of movement of the handpiece 11 in shearing. The tension between the cutter 14 and the comb 13 may readily be adjusted by varying the position of the tension nut 109. By virtue of the sealing means described above, all bearing surfaces are positively sealed against contact with dirt and the like encountered during shearing, and all bearing surfaces are assured of adequate lubrication while the handpiece is in operation. These features, coupled with the improved arrangement of the tension pin 101 relative to the fork 27, it is believed, make for the greatly increased life of the present handpiece.

While there has been illustrated and described a particular embodiment of the present invention, it will be understood that various changes and modifications will readily suggest themselves to those skilled in the art. It is aimed in the appended claims to cover all such changes and modifications as fall within the true spirit and scope of the present invention.

What is claimed as new and desired to be secured by Letters Patent of the United States is:

1. In a shearing handpiece, the combination of a handle assembly having a sealed chamber formed therein with an opening at one end, means defining an annular groove in said handle assembly adjacent said opening, a comb supported by said handle assembly extending outwardly from the end having the opening, a cutter movable back and forth across said comb between preselected positions, a fork having one end movable between opposed positions and engageable with said cutter and its opposite end movable between opposed positions and disposed in said chamber, means for pivotally mounting said fork intermediate its ends, means connected to the end of said fork in the chamber for effecting oscillatory movement of the ends of the fork, and diaphragm means sealed to the fork between the pivotal mounting of the fork and the cutter, said diaphragm means comprising an annular bead shaped to seat in said groove, wedge means for urging said bead into said groove to effect a seal between said handle assembly and said diaphragm means, whereby said diaphragm means closes said opening against the entrance of dirt and the like to the chamber and the leakage of oil therefrom, said diaphragm means being formed of material capable of flexing as the ends of the fork move back and forth between their preselected positions to drive the cutter.

2. The combination recited in claim 1 wherein the fork is formed with spaced shoulders, and the diaphragm means is formed with a sleeve portion shaped to be disposed between said shoulders to effect a seal between the diaphragm and the fork.

3. In a shearing handpiece, the combination of a handle assembly, a comb mounted on said handle assembly, a cutter, means for effecting oscillatory movement of said cutter including a fork having a pivot recess formed thereon and drivingly connected to said cutter, a sleeve projection spaced from said cutter mounted on said handle assembly, a tension pin having an end received in said pivot recess and its opposite end disposed in said sleeve, spaced shoulders defined on said tension pin adjacent said opposite end, a tension pin cup disposed in said sleeve and having a bearing recess engageable with the opposite end of said tension pin, means engageable with the cup for adjusting the tension between the cutter and the comb, and means comprising a flexible diaphragm having a first portion expanded into engagement with the interior walls of said cup and a second portion disposed between said spaced shoulders forming a seal between the tension pin and the walls of the cup to provide a chamber adjacent the opposite end of the tension pin for lubricant for the bearing surfaces between the pin and the cup, said means being flexible to permit limited oscillatory movement of the tension pin as effected by the cutter moving between its preselected positions.

4. The combination recited in claim 3 wherein said first portion of said flexible diaphragm comprises an annular portion engageable with the walls of the cup, and radially expansible means urging said first portion into sealed engagement with the walls.

5. In a shearing handpiece, the combination of a handle assembly, a comb mounted on said handle assembly, a cutter disposed in shearing engagement with said comb and movable between preselected positions, means for oscillating said cutter between said preselected positions including a fork having one end drivingly connected to said cutter, pivot means for said fork intermediate the ends thereof, support means on said assembly disposed in spaced relation to said fork, a pin interposed between a point on said fork and said support means for urging said cutter into shearing engagement with said comb, said support means being so disposed that the arcuate paths of said point on said fork and the end of said pin engageable therewith differ slightly in a direction to provide an increase of force transmitted through said pin when said cutter approaches said preselected positions as contrasted with when said cutter is in its center position, said pin being disposed at an angle of less than fifty degrees with the longitudinal axis of said handle assembly.

6. In a shearing handpiece, the combination of a head comprising lightweight metal, a comb secured to said head, a cutter mounted on said comb for oscillatory movement between opposed positions, a pivotally mounted fork drivingly connected at one end to said cutter, a spindle, crank means mounted on said spindle engageable with the opposite end of the fork to effect oscillatory movement of the fork, a thin-walled metal tube defining a handle portion having one end rigidly connected with said head and extending rearwardly thereof, said handle portion defining a chamber for said fork, said spindle and said crank means, said handle comprising a portion intermediate its ends of larger cross section to define an enlarged intermediate portion of the chamber to accommodate the rotation of the crank means and the oscillatory movement of the opposite end of the fork, said handle portion being shaped to be conveniently grasped by an operator whereby there is provided a handpiece having improved weight distribution and balance.

EDWIN S. BARTLETT.

References Cited in the file of this patent

UNITED STATES PATENTS

| Number | Name | Date |
| --- | --- | --- |
| 614,078 | Bland | Nov. 15, 1898 |
| 722,313 | Martin | Mar. 10, 1903 |
| 799,107 | Stewart | Sept. 12, 1905 |
| 890,984 | Hoerr | June 16, 1908 |
| 1,788,547 | Shaler | Jan. 13, 1931 |
| 2,251,620 | Stecker | Aug. 5, 1941 |
| 2,292,453 | La Mere | Aug. 11, 1942 |
| 2,296,230 | Brookes | Sept. 15, 1942 |
| 2,296,236 | Musolf | Sept. 15, 1942 |

FOREIGN PATENTS

| Number | Country | Date |
| --- | --- | --- |
| 23,225/29 | Australia | Oct. 28, 1929 |
| 320,495 | Great Britain | Oct. 17, 1929 |